United States Patent [19]

Ichinose et al.

[11] Patent Number: 5,100,197
[45] Date of Patent: Mar. 31, 1992

[54] AUTOMOTIVE VEHICLE SUNROOF STRUCTURE

[75] Inventors: Hisao Ichinose, Atsugi; Haruo Mochida, Kanagawa, both of Japan

[73] Assignee: Nissan Motor Co., Ltd., Japan

[21] Appl. No.: 716,743

[22] Filed: Jun. 14, 1991

Related U.S. Application Data

[63] Continuation of Ser. No. 484,553, Feb. 26, 1990, abandoned.

[30] Foreign Application Priority Data

Feb. 27, 1989 [JP] Japan .................................. 1-45772

[51] Int. Cl.⁵ ................................ B60J 7/05
[52] U.S. Cl. .................................... 296/216; 296/213
[58] Field of Search .............. 296/216, 221, 222, 213

[56] References Cited

U.S. PATENT DOCUMENTS

| | | | |
|---|---|---|---|
| 3,863,979 | 2/1975 | Bienert | 49/360 |
| 3,964,784 | 6/1976 | Prechter et al. | 296/215 |
| 4,293,161 | 10/1981 | Lutz | 296/213 |
| 4,553,307 | 11/1985 | Kaltz et al. | 296/222 X |
| 4,671,565 | 6/1987 | Grimm et al. | 296/213 X |
| 4,923,245 | 5/1990 | Kuwabara | 296/216 X |
| 4,946,225 | 8/1990 | Jardin | 296/216 X |

FOREIGN PATENT DOCUMENTS

| | | |
|---|---|---|
| 2851939C2 | 6/1980 | Fed. Rep. of Germany . |
| 2954165C2 | 10/1980 | Fed. Rep. of Germany . |
| 3905985 | 9/1990 | Fed. Rep. of Germany ...... 296/213 |
| 62-59119 | 3/1987 | Japan . |
| 62-85716 | 4/1987 | Japan . |
| 8702838 | 6/1989 | Netherlands ........................ 296/213 |

Primary Examiner—Dennis H. Pedder
Attorney, Agent, or Firm—Lowe, Price, LeBlanc & Becker

[57] ABSTRACT

An automotive vehicle sunroof structure including a roof panel formed with a roof opening. The roof panel is reinforced by reinforcement members each of which is located near the roof opening. Each reinforcement member is disposed to connect the roof panel and a guide rail for a sunroof lid fittable within the roof opening. The reinforcement member is formed with a plurality of brackets each of which is formed by bending the tip end section of the reinforcement member. Each bracket extends inward of the vehicle and under the roof opening. The bracket is fixedly secured to the guide rail, so that the dimension of the roof opening in the direction of the vehicle width is enlarged thereby offseting the guide rail from the upward side of the passenger's head to the lateral side of the roof.

13 Claims, 3 Drawing Sheets

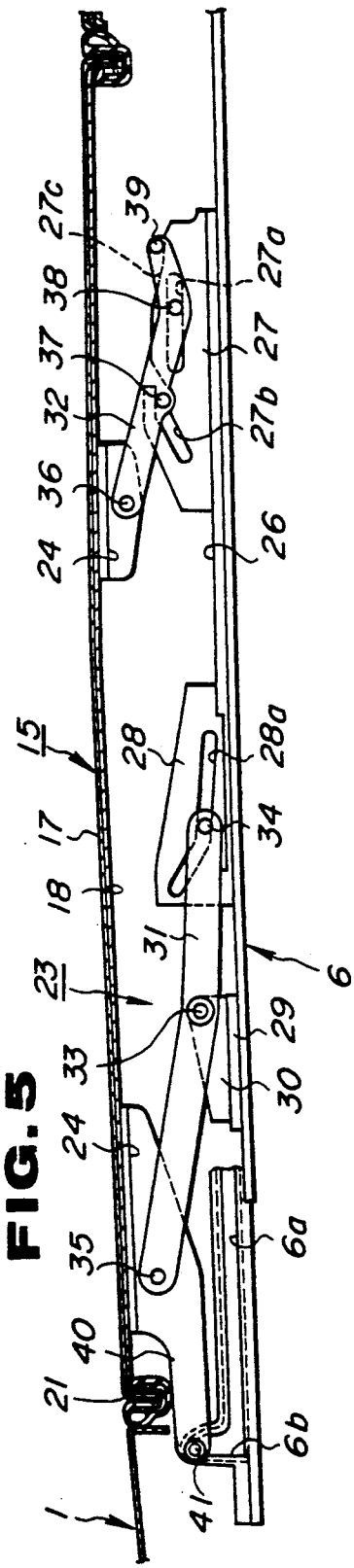
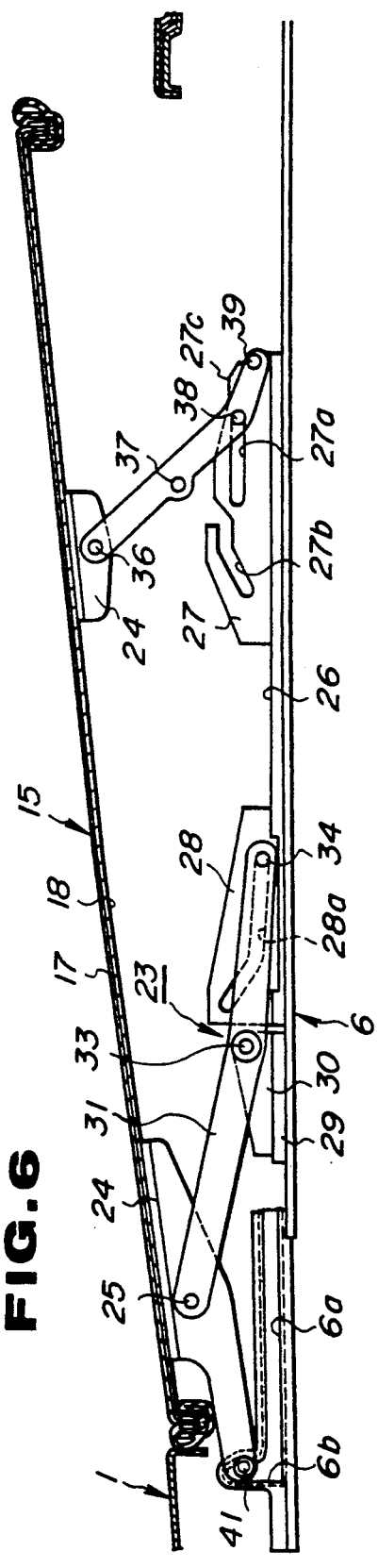
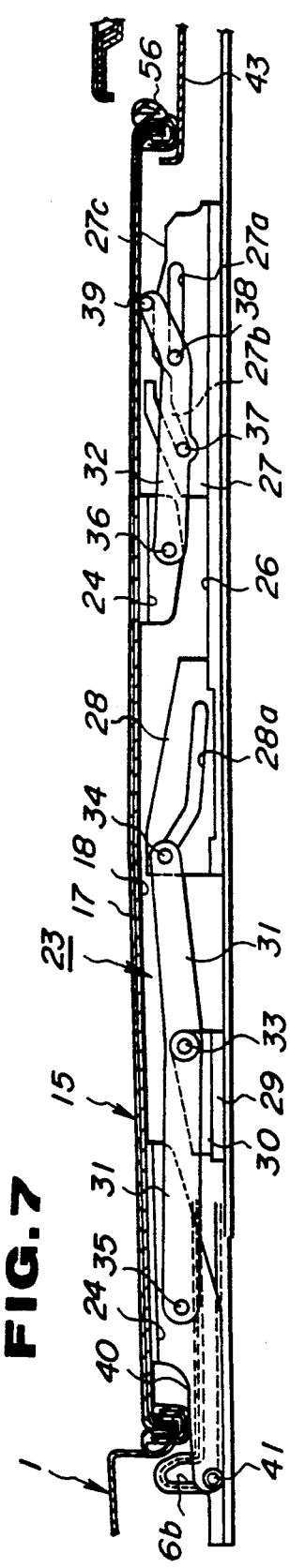

AUTOMOTIVE VEHICLE SUNROOF STRUCTURE

This application is a continuation of application Ser. No. 484,553, filed Feb. 26, 1990, now abandoned.

BACKGROUND OF THE INVENTION

1. Field of the Invention

This invention relates to improvements in a sunroof structure for an automotive vehicle, and more particularly to an installation structure of a guide rail along which a sunroof lid is slidably guided.

2. Description of the Prior Art

It is well known that an automotive vehicle is provided with a sunroof structure including a guide rail along which a sunroof lid is slidably guided. The guide rail is disposed under the sunroof lid and along a side peripheral section of a roof opening of a roof panel. Such an arrangement is disclosed, for example, in Japanese Patent provisional Publication Nos. 62-85716 and 62-59119. The roof panel having the roof opening is reinforced by a side reinforcement member disposed under the roof panel and near the roof opening. The lower section of the side reinforcement member is bent to extend outward of the vehicle.

With this arrangement, the outward bent lower section of the side reinforcement member tends to interfere with the inner periphery of a roof side rail during joining of the roof panel to the roof side rail. Therefore, it is required that the outward bent section and the roof side rail do not interfere with each other by reducing the dimension of the roof opening in the direction of vehicle width. This reduces the substantial opening area of the roof opening and the head clearance of a passenger under shift of the guide rail toward the center side of a passenger room. Furthermore, in case that the guide rail and a drip channel receiving a water are connected to the side reinforcement member, their loads are received by the roof panel connected to the side reinforcement member. Therefore, the rigidity of the roof panel cannot be sufficiently gained although the roof panel is partly reinforced by the side reinforcement member. Additionally, this causes a slight deformation of the roof opening thereby making difficult fitting of the sunroof lid within the roof opening. Therefore, the sealing performance and appearance are deteriorated thus lowering the quality of the automotive vehicle.

SUMMARY OF THE INVENTION

It is an object of the present invention to provide an improved sunroof structure which ensures a large roof opening particularly in the direction of the vehicle width and an enlarged head clearance for a passenger.

A sunroof structure of the present invention is for an automotive vehicle and comprises a roof panel having a generally flat top section. An edge flange section is angularly fixedly connected with the flat top section and extends generally along a longitudinal axis of the vehicle. The edge flange section defines a roof opening. A sunroof lid is provided to be fittable within the roof opening. A reinforcement member is fixedly fastened to the flat top section and the edge flange section of the roof panel. The reinforcement member is integrally formed with a bracket having a support section extending inward of the vehicle and under the roof opening. A guide rail is provided to guide the roof panel to be slidably movable along the guide rail. The guide rail is further integrally formed with an installation seat section which is located outside of the guide rail with respect to the vehicle longitudinal axis. The bracket support section is fixed to the installation seat section.

Accordingly, interference of the bracket with a roof side rail is avoided during assembly operation by inwardly bending the bracket of the side reinforcement member. As a result, the dimension of the roof opening in the vehicle width direction can be enlarged. Additionally, the set position of the guide rail can be made close to the roof side rail, so that the guide rail is offset from the upward side of the passenger's head to the lateral side of the roof. This enlarges the clearance between the head top of a passenger and the inner side of the roof, thereby improving living comfortableness for the passenger.

BRIEF DESCRIPTION OF THE DRAWINGS

FIG. 5 is a cross-sectional view of the sunroof structure of FIG. 1 taken in the direction of arrows substantially along the line V—V of FIG. 1, showing an operational mode of the sunroof structure;

FIG. 6 is a cross-sectional view similar to FIG. 5 but showing another operational mode; and FIG. 7 is a cross-sectional view similar to FIG. 5 but showing a further operational mode.

DETAILED DESCRIPTION OF THE INVENTION

Figure 1:
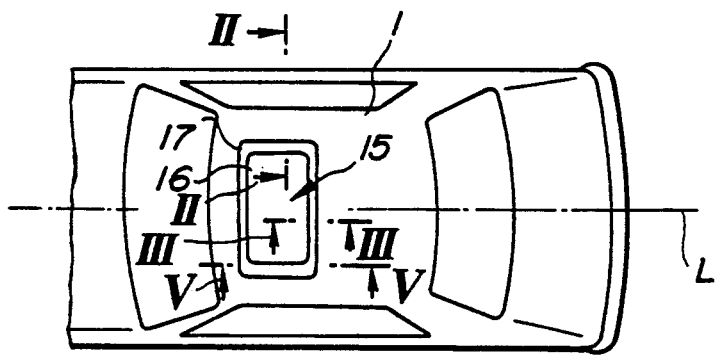
FIG. 1 is a schematic plan view of an automotive vehicle provided with an embodiment of a sunroof structure according to the present invention.
Figure 2:
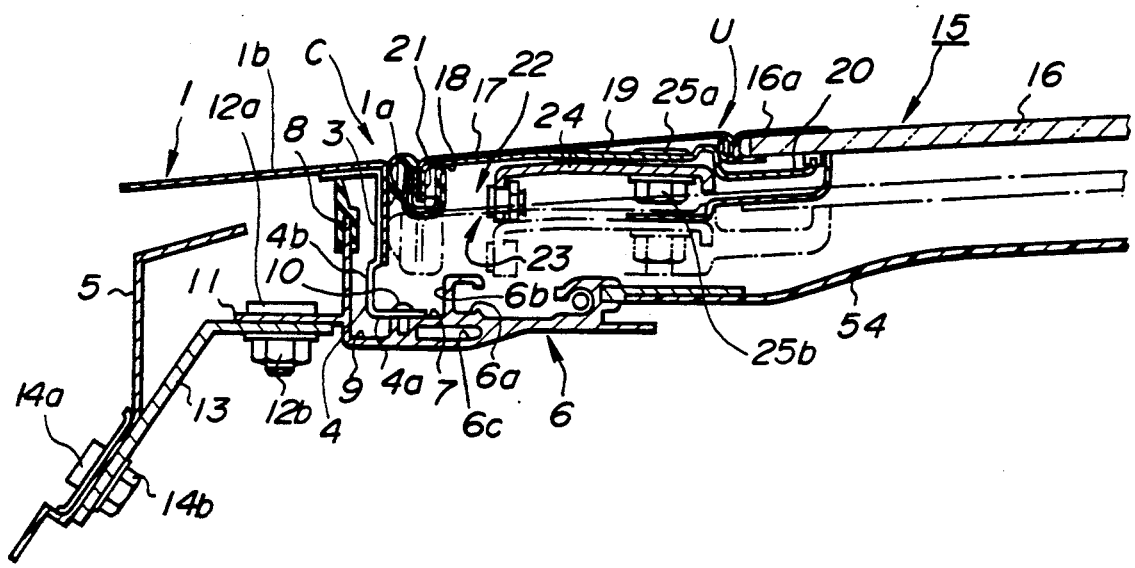
FIG. 2 is a cross-sectional view of an essential part of the sunroof structure of FIG. 1, taken in the direction of arrows substantially along the line II—II of FIG. 1.

Referring now to FIGS. 1 to 7, an embodiment of a sunroof structure according to the present invention is illustrated. The sunroof structure of this embodiment is of an automotive vehicle and comprises a roof panel 1 having a roof opening 2 which is in the generally rectangular shape. The roof opening 2 is defined by a peripheral edge flange section 1a which is formed by bending the inner peripheral portion of the roof panel 1. The peripheral edge flange section 1a is integral with a top flat section 1b of the roof panel and generally perpendicularly extends from the top flat section 1b so as to form a bent corner section C having a generally L-shaped cross-section. The roof panel 1 is reinforced with a pair of side reinforcement members 3 fastened to the roof panel 1 near the peripheral lateral side of the roof opening 2. Each side reinforcement member 3 has a plurality of brackets 4 fixedly connected to a guide rail 6. The side reinforcement member 3 extends along the vehicle longitudinal axis L and fixedly fastened throughout the roof panel top flat section and peripheral edge flange section 1a, 1b, so as to cover the bent corner section C. In this embodiment, each bracket 4 is formed by bending the tip end section of the side reinforcement member 3 inward and formed L-shaped. Each bracket 4 is separate from and does not contact with a roof side rail 5 fixedly secured to a vehicular body during joining of the roof panel 1 with the roof side rail 5. The bracket 4 has a support section 4a which extends generally parallel with the roof panel top flat section 1a or parallel with a horizontal plane (not shown) including a longitudinal axis L of the vehicle. The installation seat section 7 has a flat surface to which the bracket support section 4a is fixedly mounted. Such fixing of the bracket support section 4a is accomplished by a small screw 10 screwed into a vertical threaded hole (no numeral) which does not pierce the wall of the installation seat section 7 or does not reach the lower surface of the installation seat section 7. Thus the dimension of the roof opening 2 in the direction of vehicle width is enlarged and therefore the guide rail 6 can be disposed considerably near the roof side rail 5. Thus, a relatively large clearance or passenger's head clearance is formed between the head top of a passenger and the inner side of a vehicular roof.

An installation seat section 7 for the side reinforcement member 3 is formed outside of the guide rail 6 with respect to the longitudinal axis L. A rising wall 8 defining a drip channel g is formed outside of the installation seat section 7 with respect to the vehicle longitudinal axis L. The rising wall 8 is disposed outside of the side reinforcement member 3. The drip channel 9 is formed between the rising wall 8 and the outer side section of the side reinforcement member 3 which cannot be seen from the outside of the vehicle thereby improving the appearance of the sunroof structure. As shown, the level of the bottom surface of the drip channel 9 is lower than the level of the flat surface of the installation seat section 7 thereby forming a step-like section. The rising wall 8 extends upwardly and is provided at its tip portion with an elastomeric seal member (no numeral) contacting with the side reinforcement member 3 fastened to the roof panel 1. It will be understood that the guide rail 6, the side reinforcement member 3, the installation seat section 7 and the rising wall 8 extend along the vehicle longitudinal axis L. Accordingly the drip channel 9 extends along the vehicle longitudinal axis L. Another drip channel (no numeral) is formed on the flat surface of the installation seat section 7 and defined between the vertically extending portion 4b of the bracket 4 and a rising wall 6b of the guide rail 6. This drip channel extends along the vehicle longitudinal axis and is communicated with the drip channel 9 through a space between the adjacent brackets 4. A hollow (no numeral) is formed in the guide rail 6 to prevent the guide rail 6 from increasing in weight in case of increasing the thickness of the guide rail 6 to enlarge the depth of the vertical hole. A bracket 11 is horizontally outwardly protruded from the rising wall 8 at the under side section. The bracket 11 is fixedly connected with a body side bracket 13 with a bolt 12a and a nut 12b. The body side bracket 13 is fixedly connected with the roof side rail 5 with a bolt 14a and a nut 14b, so that the guide rail 6 is substantially supported to the roof side rail 5. The roof side rail 5 is adapted to receive a load of a sunroof unit U including a sunroof lid 15, a driving link mechanism 23 and the like, thereby improving the installation rigidity of the sunroof unit U.

In assembly, after the roof panel 1 is dropped onto and joined to the roof side rail 5 and front and rear roof side rails (not shown), the bracket support section 4a is positioned on the installation seat section 7 and fixed by the small screw 10 in such a manner that the rising wall 8 is located outside of the side reinforcement member 3. Accordingly, the drip channel is formed between the side reinforcement member 3 and the rising wall 6b of the guide rail 6 as discussed above.

A sunroof lid 15 is provided to be slidably guided in the forward and rearward direction along the guide rail 6. The sunroof lid 15 includes a center panel 16 made of transparent or translucent plate such as glass plate or plastic plate. A surrounding panel 17 made of a hard sheet such as sheet metal is fixedly disposed around the center panel 16. An inner panel 18 is connected to the lower surface of the surrounding panel 17 and includes a horizontal section 19 generally parallel with the guide rail 6. The horizontal section 19 is located under the surrounding panel 17. An overhang section 20 of the inner panel 18 extends inward over the inner peripheral section of the surrounding panel 17. The inner periphral section of the surrounding panel 17 downwardly extends and is engaged with a retainer 16a fixed to the outer peripheral section of the center panel 16, in such a manner that the outer surface of the surrounding panel 17 flushes with the outer surface of the center panel 16. The end portion of the overhang section 20 of the inner panel 18 is resiliently contacted with the inner surface of the center panel 16. Therefore, the surrounding panel 17 is tightly connected to the outer peripheral section of the center panel 16. In this arrangement, a link receiving space 22 is formed under the surrounding panel 17 so as to be surrounded by the overhang section 20 and the outer flange 21 of the inner panel 18.

Figure 4:
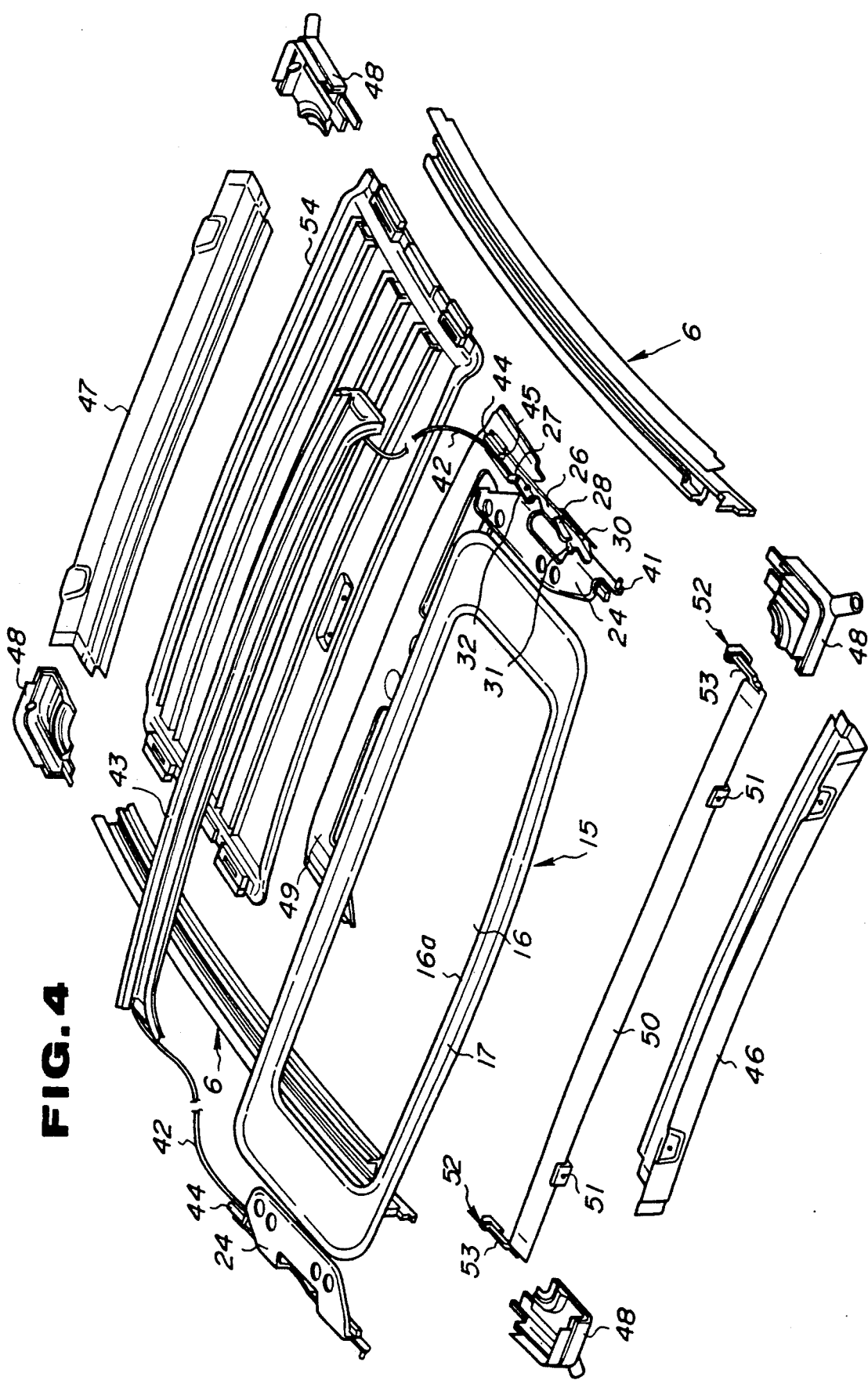
FIG. 4 is an exploded perspective view of the sunroof structure of FIG. 1.

A driving link mechanism 23 is provided to drive the sunroof lid 15 and includes a link bracket 24 which is disposed in the link receiving space 22 and fixed to the horizontal section 19 of the inner panel 18 with a bolt 25a and a nut 25b, in which the link bracket 24 serves as a base in assembly. The driving link mechanism 23 includes a rear guide 27, a front sub-guide 28, a front guide 30, a front link 31, a rear link 32 and the like. The rear guide 27 and the front sub-guide 28 are fixedly mounted on a rear guide shoe 26 engaged with the guide rail 6. The front guide 30 is fixedly mounted on a front guide shoe 29 engaged with the guide rail 6. The front link 31 interconnects the link bracket 24 with the guides 28, 29. The rear link 32 interconnects the link bracket 24 with the guide 27. The front link 31 is pivotally connected at its central section with the front guide 30 through a pin 33 and is slidably connected at its rear end section with the guide slit 28a of the guide 28. The front link 31 is pivotally connected at its front end section with the front link bracket 24 through a pin 35. The rear link 32 is pivotally connected at its front end section with the rear end section of the rear link bracket 24 through a pin 36. First, second and third guide pins 37, 38, 39 are fixedly provided in the rear link 32. The first guide pin 37 is slidably engaged with a cam groove 27b formed in the rear guide 27. The second guide pin 38 is slidably engaged with a guide slit 27a formed in the rear guide 27. The third guide pin 39 is slidably engaged with a cam surface 27c formed in the rear guide 27. An arm section 40 is formed at the front end part of the link bracket 24 and extend forward. A guide pin 41 provided at the end of the arm section 40 is slidably connected to a rail groove 6a which is formed at the front section of the guide rail 6. A rising groove 6b is formed contiguous with the front end of the rail groove 6. The sunroof lid 15 can be tilted up upon being pivotally moved around an engaged point at which the guide pin 41 and the upper end portion of the rising groove 6b are engaged with each other. The rear guide shoes 26 is interconnected to a drive wire 42 which is driven by a motor through a speed reducer (not shown). Therefore, the rear guide 27 and the front sub-guide 28 are simultaneously slide forward and rearward under the pushing and pulling actions by the drive wire 42. The front guide shoe 29 of the front guide 30 is connected to a drain shoe 44 which is connected to the rear drain 43 through a rod 45 passing through the rear guide shoe 26. Therefore, the front guide 30 and the rear drain 43 simultaneously slide forward and rearward. As shown in FIG. 4, front and rear traversers 46, 47 are respectively connected with the front and rear end sections of each guide rail 6 through corner pieces 48. A reinforcement traverser 49 is disposed at the rear side section of each guide rail 6 so as to connect the light and left guide rails 6. A deflector 50 is connected to the front section of the front traverser 46 and is supported at its both side edges by link mechanisms 52 fixed on the front end sections of the both guide rails 6. When a link member 53 of the link mechanism 52 is pushed or pulled by the front end section of the sunroof lid 15, the deflector 50 is provided or withdrawn relative to the roof opening 2 upon the opening or closing action of the sunroof lid 15. A shade 54 is provided to be slidably moved along the right and left guide rails 6 under the sunroof lid 15.

The manner of operation of the thus arranged sunroof structure will be discussed hereinafter.

When the rear guide shoe 26 is pushed forward by the drive wire 42 in a condition of FIG. 5, the guide pin 34 of the front link 31 is moved toward the rear stop end section of the guide slit 28a of the front sub guide 28. The first, second and third guide pins 37, 38, 39 are respectively moved to the rear sections of the cam groove 27b, the guide slit 27a and the cam surface 27c of the rear guide 27. The first guide pin 37 is released from the cam groove 27b while the third guide pin 39 is moved to a recess which is located at the back section of the cam surface 27c. As a result, the sunroof lid 15 is tilted up upon being pivoted around the guide pin 41 of the arm section 40 of the front end of the link bracket 24 as shown in FIG. 6. Thus the condition in FIG. 5 is changed to a condition in FIG. 6.

Figure 3:
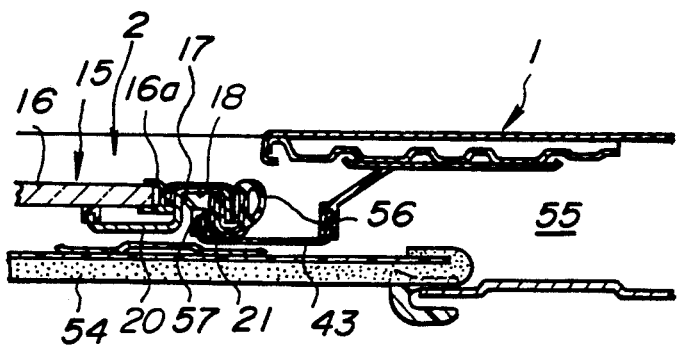
FIG. 3 is a cross-sectional view of another essential part of the sunroof structure of FIG. 1, taken in the direction of arrows substantially along the line III—III of FIG. 1.

When the rear guide shoe 26 is pulled rearward by the drive wire 42 in the condition of FIG. 5 in which the sunroof lid 15 is at a closing position, the guide pin 34 of the front link 31 is moved to the front end stop section of the guide slit 28a of the front sub slit 28 under the rearward movement of the rear guide shoe 26. Then the first, second and third guide pins 37, 38, 39 are slidingly moved respectively to the front side sections of the cam groove 27b, the guide slit 27a and the cam surface 27c. Accordingly, the sun roof lid 15 once shifts down to its lower position from the closing position. With this movement, the guide pin 41 of the arm section 40 moves toward the bottom of the rising groove 6b. Thus, a rear part of the end flange 21 disposed at the back section of the surrounding panel 17 slides onto the rear drain 43 so as to engage with each other as shown in FIG. 3. The rear part of the end flange 21 and the rear drain 43 are double sealed with weather strips 56, 57 in the forward and rearward direction. After such a downward movement of the sunroof lid 15, the sunroof lid 15, the front guide 30 and the rear drain 43 are slidably moved into a sunroof receiving space 55 along the guide rail 6, thereby causing the roof opening 2 to open.

The advantageous effects of the thus arranged sunroof structure will be discussed. The height dimension between the sunroof lid 15 and the guide rail 6 can be reduced by the dimension of a part of the link bracket 24 received in the link receiving space 22 under the surrounding panel 17 formed of the hard sheet. Additionally by virtue of formation of the link receiving space 22 under the surrounding panel 17, when the sunroof lid 15 is moved downward, the back end section of the surrounding panel 17 is engaged at its outer flange 21 with the front edge flange of the rear drain 43 to be offset each other. As a result, the guide rail 6 can be located near the side of the roof panel 1, thereby shortening the total height dimension of the sunroof unit U. Thus, the passenger's head clearance is increased. Especially by virtue of the fact that the interference of the bracket 4 with the roof side rail 5 is avoided during assembly operation by inwardly bending the bracket 4 of the side reinforcement member 3 connected to side periphery of the roof opening 2, the dimension of the roof opening 2 in the vehicle width direction is enlarged. Additionally, if the set position of the guide rail 6 is made close to the roof side rail 5, the above-mentioned head clearance is further enlarged since the guide rail 6 is offset from the upward side of the passenger's head to the lateral side of the roof, thereby improving living comfortableness for the passenger. In addition, since the drip channel 9 receiving a rain water or the like is disposed between the rising wall 8 and the outside section of the side reinforcement member 3, the drip channel 9 cannot be seen from the outside of the vehicle when the roof opening 2 is opened. Therefore, the appearance and the quality of the vehicle body can be improved. Furthermore, the roof side rail 5 is adapted to receive a load of the sunroof unit U, thereby improving the installation rigidity of the sunroof unit U.

What is claimed is:

1. A sunroof structure for an automotive vehicle, comprising:

a roof panel having a generally flat top section, and an edge flange section angularly fixedly connected with said flat top section and extending generally parallel to the longitudinal axis of the vehicle positioned at the center of the vehicle, said edge flange section defining a roof opening;

a sunroof lid fittable within said roof opening;

a reinforcement member fixedly fastened to said flat top section and said edge flange section of said roof panel;

a bracket integral with said reinforcement member and having a support section extending inward of the vehicle and under said roof opening, said support section being generally parallel with said sunroof lid, said support section having a first surface faceable to said sunroof lid and a second surface opposite to said first surface;

a guide rail by which said sunroof lid is guided to be slidably movable along said guide rail; and an installation seat section integral with said guide rail and located laterally outwardly of said guide rail with respect to the longitudinal axis positioned at the center of the vehicle, said installation seat section contacting the second surface of said bracket support section and being fastened to said bracket support sect at a position where the second surface of said bracket support section contacts said installation seat section.

2. A sunroof structure as claimed in claim 1, wherein further comprising a rising wall integral with said guide rail and located laterally outwardly of said installation seat section with respect to the longitudinal axis, said rising wall defining a first channel between it and said installation seat section, and means for lowering a level of a bottom surface of said channel relative to a level of said support section.

3. A sunroof structure as claimed in claim 2, wherein said rising wall is adapted to be fixedly connected to a vehicle body.

4. A sunroof structure as claimed in claim 1, further comprising a driving link mechanism though which said sunroof lid is drivable connected to said guide rail.

5. A sunroof structure as claimed in claim 1, wherein said guide rail is located under said roof opening and extends parallel with the vehicle longitudinal axis.

6. A sunroof structure as claimed in claim 1, wherein said reinforcement member extends parallel with the vehicle longitudinal axis.

7. A sunroof structure as claimed in claim 2, wherein said rising wall extends parallel with the vehicle longitudinal axis.

8. A sunroof structure as claimed in claim 7, wherein said first channel extends parallel with the vehicle longitudinal axis.

9. A sunroof structure as claimed in claim 1, wherein said installation seat section has a flat surface to which said bracket support section is fixedly mounted.

10. A sunroof structure as claimed in claim 9, further comprising means defining a second channel on said installation seat section, said channel extending parallel with the vehicle longitudinal axis and communicating with said first channel.

11. A sunroof structure as claimed in claim 1, wherein said bracket support section extends generally parallel with a horizontal plane including the vehicle longitudinal axis.

12. A sunroof structure for an automotive vehicle, comprising:
a roof panel having a generally flat top section, and an edge flange section angularly fixedly connected with said flat top section and extending generally along a longitudinal axis of the vehicle, said edge flange section defining a roof opening;
a sunroof lid fittable within said roof opening;
a reinforcement member fixedly fastened to said flat top section and said edge flange section of said roof panel;
a bracket integral with said reinforcement member and having a support section extending inward of the vehicle and under said roof opening, said support section being generally parallel with said sunroof lid, said support section having a first surface faceable to said sunroof lid and a second surface opposite to said first surface;
a guide rail by which said sunroof lid is guided to be slidable movable along said guide rail;
an installation seat section integral with said guide rail and located laterally outwardly of said guide rail with respect to the longitudinal axis positioned at the center of the vehicle, said installation seat section contacting the second surface of said bracket support section and being fastened to said bracket support section at a position where the second surface of said bracket support section contacts said installation seat; and
a driving link mechanism through which said sunroof lid is drivable connected to said guide rail, said driving link mechanism including a link bracket connected to a peripheral section of said sunroof lid, said link bracket being disposed under said sunroof lid peripheral section.

13. A sunroof structure as claimed in claim 1, further comprising a small screw for connecting said bracket support section and said installation seat section, said small screw having a head portion contacted with said bracket support section first surface.

* * * * *